United States Patent [19]

McKinnis Darin N.

[11] Patent Number: 5,160,233
[45] Date of Patent: Nov. 3, 1992

[54] FASTENING APPARATUS HAVING SHAPE MEMORY ALLOY ACTUATOR

[75] Inventor: McKinnis Darin N., Houston, Tex.

[73] Assignee: The United State of America as representd by the Administrator of the National Aeronautics and Space Administration, Washington, D.C.

[21] Appl. No.: 882,408

[22] Filed: May 13, 1992

[51] Int. Cl.$^5$ .................. F16B 37/08; F16B 39/36
[52] U.S. Cl. ................... 411/433; 411/267; 411/909
[58] Field of Search ............. 411/266, 267, 270, 432, 411/433, 522, 909, 916, 917

[56] References Cited

U.S. PATENT DOCUMENTS

| | | | |
|---|---|---|---|
| 3,120,149 | 2/1964 | Dickie | 411/433 |
| 3,334,536 | 8/1967 | Armstrong | 411/267 X |
| 4,634,201 | 1/1987 | Kemka | 339/30 |
| 4,809,452 | 3/1989 | Brown | 40/417 |
| 4,841,100 | 6/1989 | Ignasiak | 174/138 G |
| 4,875,266 | 10/1989 | Batten | 411/433 X |
| 4,880,343 | 11/1989 | Matsumoto | 411/222 |
| 4,929,135 | 5/1990 | DeLarue et al. | 411/267 |
| 4,945,727 | 8/1990 | Whitehead et al. | 60/527 |
| 4,973,024 | 11/1990 | Homma | 251/11 |

FOREIGN PATENT DOCUMENTS 1434314  10/1988  U.S.S.R. .............. 411/909

Primary Examiner—Neill R. Wilson
Attorney, Agent, or Firm—Hardie R. Barr; Guy M. Miller; Edward K. Fein

[57] ABSTRACT

A releasable fastening apparatus includes a connecting member and a housing, the housing supporting a gripping mechanism adapted to engage the connecting member. A triggering member is movable within the housing between a first position in which it constrains the gripping mechanism in locked engagement with the connecting member, and a second position in which the gripping mechanism is disengaged from the connecting member. A shaped memory alloy actuator is employed for translating the triggering member from its first to its second position, the actuator being operable to expand longitudinally when transitioned from a martensitic to an austenitic state.

10 Claims, 3 Drawing Sheets

FASTENING APPARATUS HAVING SHAPE MEMORY ALLOY ACTUATOR

ORIGIN OF THE INVENTION

The invention described herein was made by employee(s) of the United States Government and may be manufactured and used by or for the Government of the United States of America for governmental purposes without the payment of any royalties thereon or therefor.

BACKGROUND OF THE INVENTION

This invention relates to releasable fastening apparatus and, more particularly, to a releasable fastening apparatus utilizing a shape memory alloy actuator.

Releasable fastening devices are commonly used in aerospace vehicles and in other applications wherein which it is necessary to interconnect mutually adjacent structures which must subsequently be quickly and reliably disconnected. One application of such fastening devices is the interconnection of spacecraft components which must be separated during launch or in a subsequent phase of a mission. For example, the external fuel tanks of certain space vehicles are rigidly connected to the vehicles by means of pyrotechnically actuated fasteners, termed explosive bolts, for permitting release and jettisoning of the tanks after the fuel has been exhausted. Such fasteners are actuated by pyrotechnic squibs, by means of electrical current conducted through resistive elements adjacent the respective explosive charges, whereby a plurality of fasteners may be released by the application of appropriate levels of current.

Whereas such pyrotechnic fasteners have proved useful in certain applications, they entail several limitations and disadvantages. A major disadvantage is that they entail hazards in storage and handling, resulting in increased costs for maintaining safety precautions during transportation, storage, and use. Additionally, explosive release mechanisms are susceptible to inadvertent detonation from brief pulses of electrical charges, and they must be carefully isolated from any potential sources of such stray electrical pulses.

A further disadvantage of such pyrotechnic fastener mechanisms is that their detonation adjacent spacecraft components imparts physical shock and vibration which may be transmitted to delicate components such as integrated circuits, circuit boards, and the like. The detonation of such explosive charges may thus result in damage to sensitive components. Additionally, shock and vibration are transmitted to the crew. A further disadvantage is that the pyrotechnic release mechanisms cannot be nondestructively tested, because the squibs are consumed during use. Although such release mechanisms are generally reliable, it is important in certain applications that the fastener mechanisms be fully tested prior to use. Another disadvantage of such pyrotechnic fastener mechanisms is that they are not capable of repeated use. Thus, they are not suited for applications in which two structures must be connected and disconnected repeatedly, without substantial down time for refurbishing the release mechanisms.

Other prior-art fastener devices have entailed electromechanically actuated release mechanisms. Such devices generally are not sufficiently reliable for use in critical aerospace applications and often entail excessive weight and complexity.

OBJECTS OF THE INVENTION

It is therefore a major object of the present invention to provide a new and improved releasable fastening mechanism.

Another object is to provide a releasable fastening mechanism which is highly reliable and suited for use in critical aerospace applications.

Yet another object is to provide such a fastening mechanism which may be conveniently and nondestructively tested prior to use.

A still further object is the provision of such a fastening mechanism which may be actuated from a remote location, yet which does not require the use of pyrotechnic ignition devices, whereby the difficulties and costs entailed in the storage and handling of such pyrotechnic devices are eliminated.

Another object is the provision of such a fastening mechanism which is not susceptible to accidental detonation from spurious pulses or "spikes" of electrical current.

Yet another object is the provision of a fastening mechanism which, in operation, does not produce excessive shock or vibration which could damage electrical circuits or other sensitive components in structures which are interconnected by one or more of the fastening mechanisms.

Other objects and advantages of the invention will become apparent from the specification and appended claims and from the accompanying drawing illustrative of the invention.

SUMMARY OF THE INVENTION

A fastening mechanism is disclosed which is adapted for releasably interconnecting two adjacent structures. In one embodiment, the fastening mechanism includes a housing having a locking mechanism and a bolt or other connecting member adapted to extend within the locking mechanism, the locking mechanism being operable to releasably engage the connecting member. The fastening mechanism, in use, is suitably connected between first and second structures which are to be connected. Suitably, the housing is connected to the first structure, and the connecting member is connected to the second structure, whereby when the locking mechanism is actuated to release the connecting member, the connecting member and the attached second structure may be withdrawn from the housing and separated from the first structure. The locking mechanism includes a piston structure which is slidably mounted within the housing. As will be more fully understood from the detailed description to follow, translation of the piston structure within the housing is effective to actuate the release mechanism for disengaging and releasing the connecting member, and it serves as a triggering member during actuation of the release mechanism. A shape memory alloy actuator is employed for translating the piston structure to actuate the release mechanism. In one embodiment, the shape memory alloy actuator is mounted within a portion of the housing for displacing the piston structure by transition of the shape memory alloy actuator between martensite and austenite states.

BRIEF DESCRIPTION OF THE DRAWING

FIG. 2 is a cross-sectional view taken as on line II—II of FIG; 1a;

DETAILED DESCRIPTION OF PREFERRED EMBODIMENT

Figure 1A:
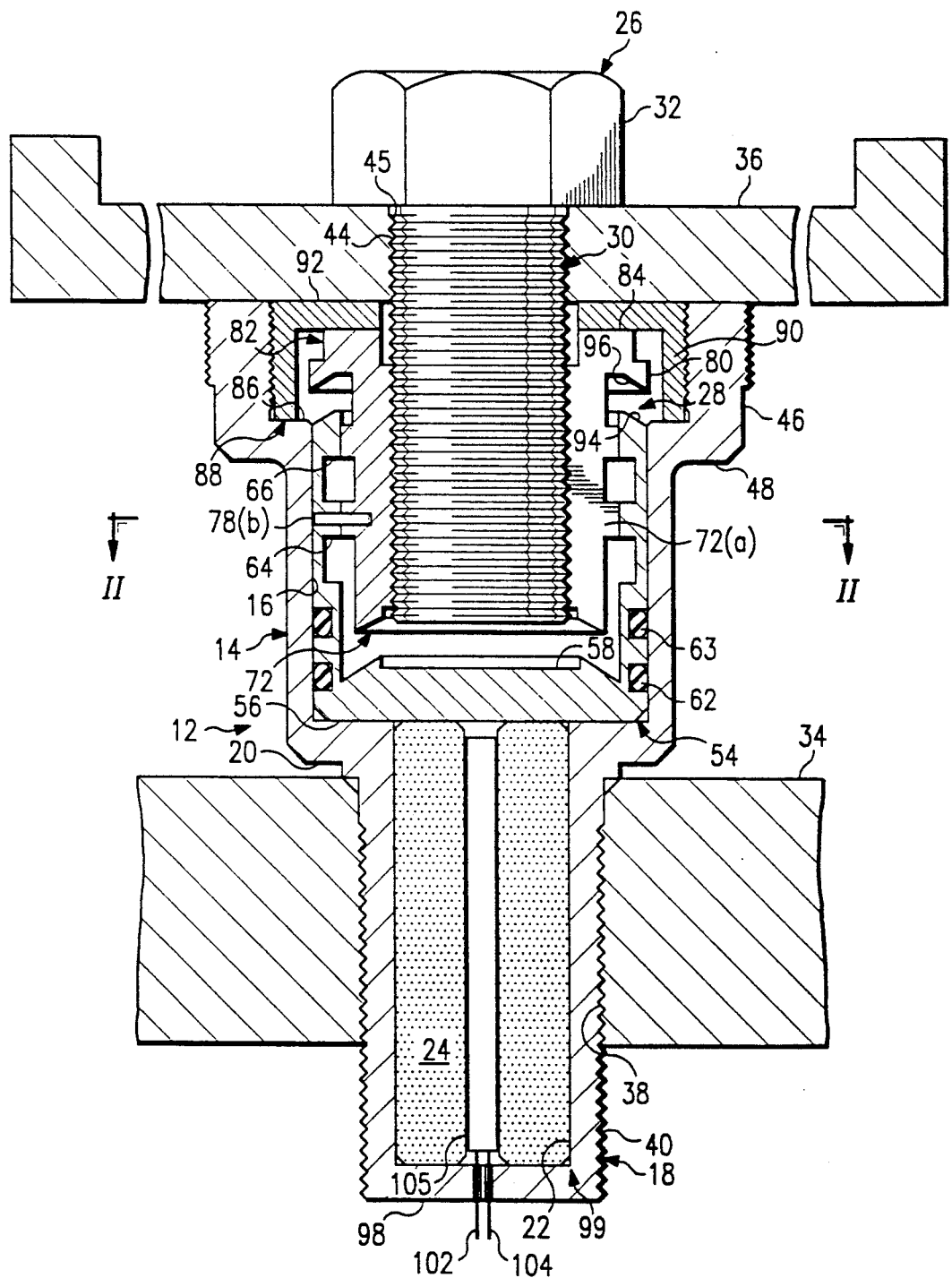
FIG. 1a is a longitudinal, partially sectional view of the release mechanism showing the connecting member, in side elevation, engaged within the locking mechanism, and including cross-sectional representations of portions of the first and second structures.

With initial reference to FIG. 1a, a first embodiment of the releasable fastening mechanism 10 includes a housing 12 having a first, generally cylindrical portion 14 defining a piston chamber 16, and a second, reduced diameter portion 18 coaxial of the first portion and suitably connected integrally therewith through a radially extending, first step portion 20. The second housing portion 18 defines an elongated, cylindrical chamber 22 which contains a shape memory alloy actuator element 24, to be described hereinbelow.

The piston chamber 16 is open at its end opposite the second housing portion 18 for receiving a connecting member 26 and a locking mechanism 28. The connecting member 26 suitably comprises a hex bolt and includes an elongated shank 30 and head portion 32, the shank being of sufficient length to extend within the locking mechanism 28, as seen in FIG. 1 and as will be more fully described.

In the present embodiment, the releasable fastening mechanism 10 is employed for interconnecting first and second structures 34, 36. The portion of the first structure 34 illustrated in the drawing is representative of a structural wall or bulkhead of a vehicle such as a spacecraft, underwater vehicle, or the like (not shown) on which the releasable fastening mechanism 10 is mounted. The second housing portion 18 is suitably externally threaded, as indicated at 40, and is threadingly connected with corresponding internal threads formed within a bore 38 formed through the structure 34. Similarly, the elongated shaft 30 of the connecting member 26 is externally threaded and suitably is threadingly engaged within a corresponding bore 45 formed through the second structure 36, for rigidly engaging the second structure 36. In the exemplary application illustrated in the drawing, the second structure 36 is, for example, a fuel tank which is initially connected to the spacecraft by a plurality of the release members and which is to be released and jettisoned from the spacecraft after the fuel has been exhausted. The first and second structures 34,36 are thus rigidly interconnected by the releasable fastening mechanism 10. While the illustrated embodiment employs a threaded bolt as the connecting member 26 for providing connection between the structures 34, 36, other types of fasteners, known to those skilled in the related arts, may also be employed. Additionally, in some applications it may be desirable to mount the releasable fastening mechanism 10 permanently on the first structure 34 as an integral portion thereof, as by welding or other fastening means. Similarly, the connecting member 26 may alternatively be welded to or formed integrally with the second structure 36, in accordance with the requirements of a particular application.

The first housing portion 14 includes a widened cylindrical portion 46, of increased diameter, adjacent its open end. A second, radially projecting step portion 48 extends between the housing wall adjacent the piston chamber 16 and the enlarged diameter housing portion 46.

Figure 1B:
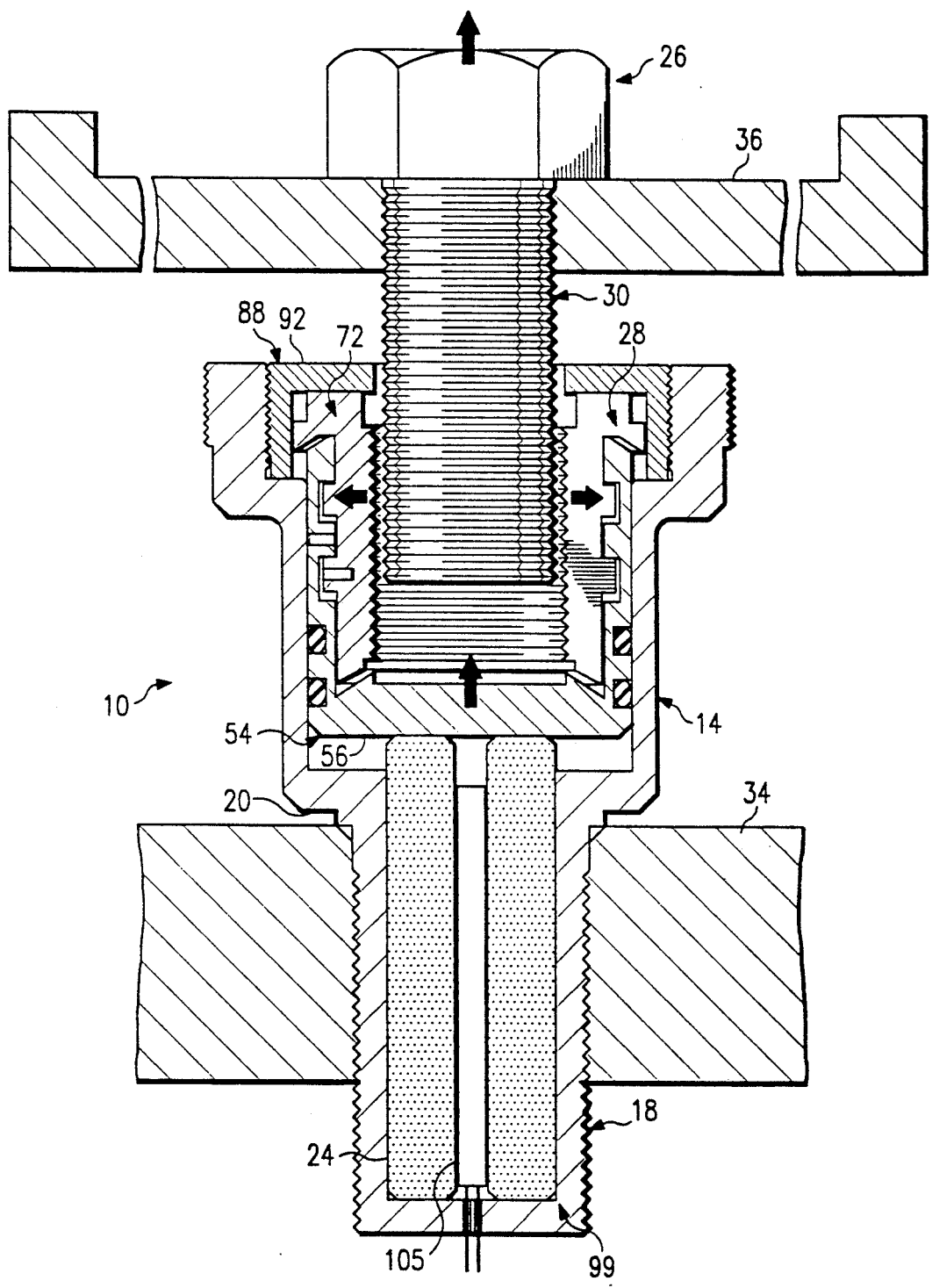

With continued reference to FIG. 1a and additional reference to FIGS. 2 and 3, the locking mechanism 28 will now be described. A piston structure 54 is slidably seated within the piston chamber 16, the piston structure having an endwall 56 which preferably has an annular depression or seat 58 formed centrally on its inner surface, in register with the distal end portion of the connecting member shaft 30. First and second, mutually spaced annular grooves 60, 61 (FIG. 3) are suitably formed circumferentially of the piston structure 54 adjacent its endwall 56 for receiving first and second, annular elastomeric seals 62, 63 (FIG. 1). The seals 62, 63 are slidably seated against the wall of the piston chamber 16 for permitting slidable movement of the piston structure from a first, retracted position, as seen in FIG. 1a, and in which its endwall 56 is seated against the first step 20, to a second, projected position as shown in FIG. 1b, as will be more fully described hereinbelow with respect to the operation of the fastening mechanism 10. At least two annular, internal lands 64, 66 are formed coaxially on the internal wall surface of the piston structure 54, mutually spaced between the second seal 63 and the open end of the piston structure 54. The first land 64 is spaced from the second land 66 by a distance d (FIG. 3), the second land 66 being formed adjacent the open end of the piston structure 54. The outer surfaces of the lands 64, 66 define mutually parallel, cylindrical bearing surfaces 68, 70, respectively (FIG. 3).

As seen in FIG. 1a, the locking mechanism 28 also includes a segmented locking structure 72, of generally cylindrical configuration, which is fitted coaxially within the piston structure 54. The locking structure 72 is divided into a plurality of generally pie-shaped segments. As seen more clearly in FIGS. 2 and 3, in the present embodiment the locking structure 72 is divided by longitudinally extending, radial cuts, angularly spaced by 120 degrees, into first, second and third segments 72(a), 72(b), and 72(c). The locking structure 72 includes first and second, external land structures 74, 76 which extend circumferentially around the locking structure 72 and are adapted to seat against the piston structure internal lands 64, 66, respectively, when the piston structure is in its first, retracted position as seen in FIG. 1. The first external land structure 74 is comprised of first, second and third land segments 74(a), 74(b), and 74(c) (FIG. 3) formed on the first, second, and third locking structure segments 72(a), 72(b), and 72(c), respectively, and the second external land structure 76 is similarly comprised of first, second and third land segments 76(a), 76(b), and 76(c). The respective widths of the external land structures 74, 76 are preferably equal to those of the internal lands 64, 66, respectively, and the land structures 74, 76 are mutually spaced by the same distance d, whereby the internal lands 64, 66 are in register with the land segments 76 and whereby the locking structure 70 constrains the segments 72(a), (b), and (c) radially inwardly in locked engagement with the shaft 30 when the piston structure 54 is in its first, retracted position. As seen more readily in FIG. 3, the interior surfaces of the segments 72(a), (b), and (c) define internal threads 75 which, as seen in FIG. 1a, are adapted to engage the external threads of the connecting member shaft 30.

Figure 2:
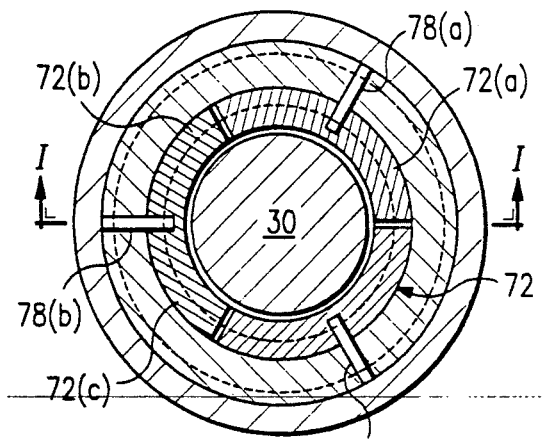
FIG. 2 is a view similar to FIG. 1a in which the connecting member is disengaged from the locking mechanism.
Figure 3:
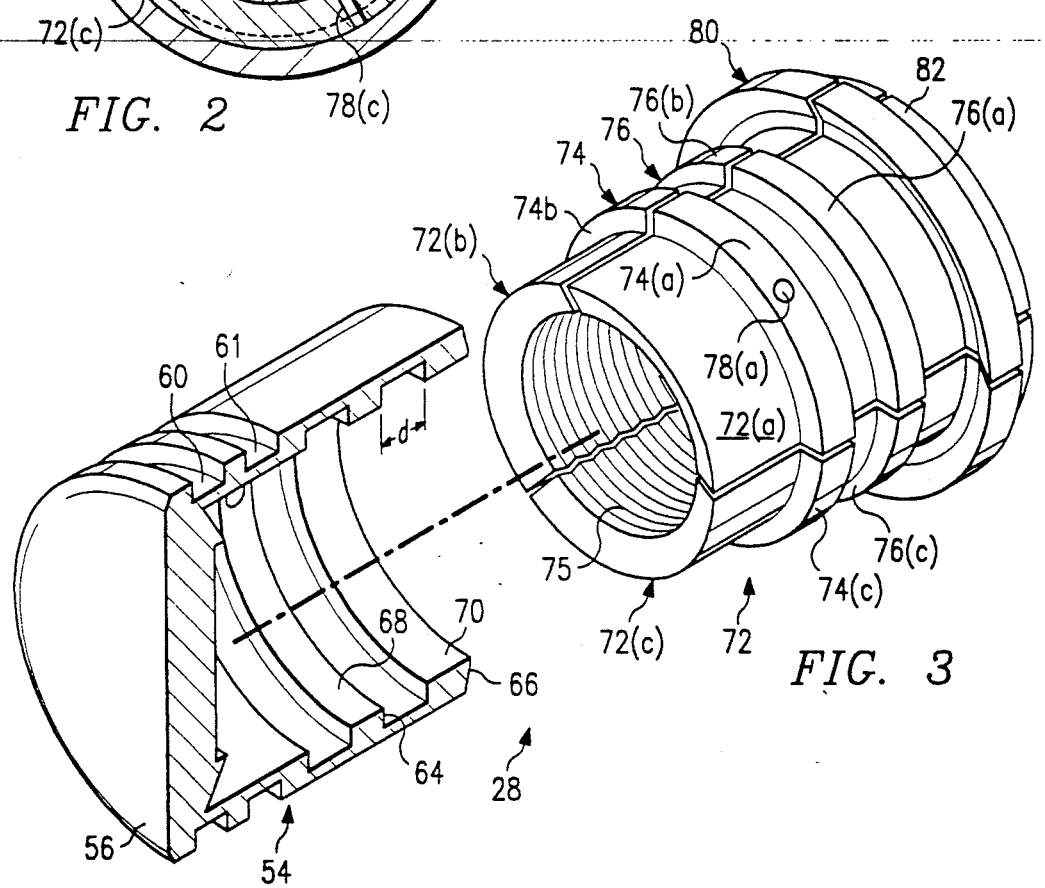
FIG. 3 is an exploded, isometric view of the piston structure and the segmented locking structure.

First, second and third shear pins 78(a), 78(b), and 78(c), as seen more clearly in FIG. 2, are employed for fixedly connecting the piston structure 54 to the first, second, and third segments 72(a), 72(b), and 72(c), respectively, the shear pins being seated within corresponding bores extending radially within the respective segments 72(a), 72(b), and 72(c), through the outer surfaces of the first land segments 74(a), 74(b), and 74(c), respectively, and in register with corresponding bores formed radially in the facing surface of the piston structure first land 64.

In the description to follow, directional terms such as "upward", "downward," and the like will be used for clarity with reference to the components as orientated in FIGS. 1a and 1b. It should be understood, however, that the releasable fastening mechanism 10 is operable in any orientation or position. In the present embodiment, the segmented locking structure 72 extends upwardly, beyond the distal, open end portion of the piston structure 54, and includes at its upper end portion a radially projecting, circumferential flange structure 80. The flange structure 80 includes an upwardly projecting annular boss structure 82 having upper, planar surface segments 84 extending perpendicularly of the housing axis.

The second step portion 48 defines an upwardly facing seat 86, extending radially outwardly adjacent the open, distal end portion of the piston structure 54. An annular cap 88 is provided within the enlarged diameter housing portion 46 and seated against the segmented locking structure 72 for constraining the segmented locking structure from upward movement within the housing. The cap 88 includes an externally threaded, cylindrical sidewall 90 and an annular flange 92 projecting radially inwardly from the cylindrical sidewall 90, the sidewall extending downwardly from the flange. The cap cylindrical sidewall 90 is threadingly engaged with the internal threads of the enlarged diameter housing section 46. Preferably, the cylindrical sidewall 90 of the cap 88 has an external length equal to the internal length of the enlarged diameter housing portion 46, whereby the cap seats against the second step portion seat 86 when the flange is fully engaged within the enlarged diameter housing portion 46, as seen in the FIGS. 1a and 1b. The annular flange 92 extends radially inwardly over the segmented structure boss structure 82 and seats against the upper surfaces 84 of the boss structure 82, for constraining the segmented structure 72 from upward movement within the chamber 16. A first, annular, bevelled surface 94 is formed on the distal end portion of the piston structure 56, and a corresponding, mating, second bevelled surface structure 96 is formed on the underside of the flange structure 80, the beveled surfaces, in cross section, extending diagonally outwardly and downwardly.

When the piston structure 54 is in its retracted position, seated against the first step portion 20 as seen in FIG. 1a, the bevelled faces 94 and 96 are mutually spaced by a distance equal to the spacing d between the first and second internal flanges 64, 60, for reasons which will become apparent from the description to follow.

The shape memory alloy element 24 of actuator 99 is an elongated, tubular structure formed of a shape memory effect alloy. As is known to those skilled in the art, such shape memory effect alloys include, for example, titanium-cobalt-nickel, titanium nickel, copper-aluminum-nickel, and others. Whereas a selection of the specific alloy to be employed in a particular application will depend upon parameters such as the length of the element, the displacement or stroke, and the level of available power for heating the element, a representative alloy which has been successfully employed in the illustrative embodiment is a nitinol alloy, of titanium nickel, wherein the titanium content is 50 percent.

Figure 4:
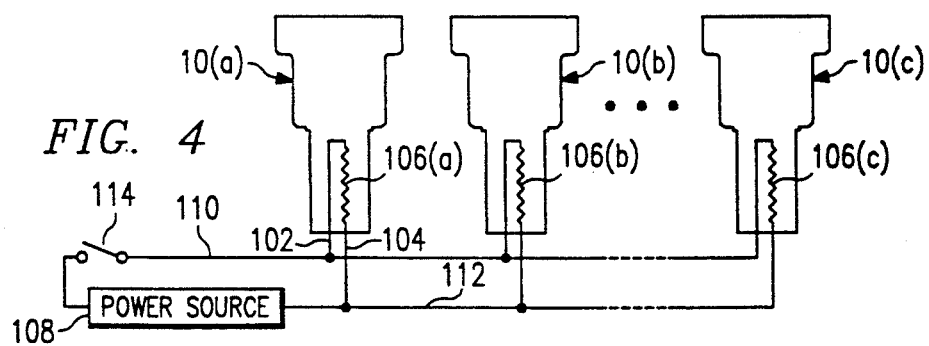
FIG. 4 is a schematic diagram showing an embodiment of the circuit and associated components employed for actuating a plurality of the release mechanisms.

Actuation of the locking mechanism 28 is accomplished by translating the piston structure 54 axially within the piston chamber 16 by axial forces produced by the actuator 99. The shape memory alloy element 24 is initially formed as a tubular structure having a length which exceeds the length of the cylindrical chamber 22 by a distance somewhat greater than the stroke of the piston structure 54 within the piston chamber 16. Its original, elongated configuration is thus approximately that shown in FIG. 1b. When in their martensitic state, such alloys are ductile and readily deformed. Installation of the element 24 within the elongated chamber 22 is accomplished by linearly compressing the element, while in its martensitic state, to the shortened configuration seen in FIG. 1a, and seating it within the elongated chamber 22 between the housing end wall 98 and the end wall 56 of the piston structure 54. A resistive element 105 is seated in the bore formed centrally through the element 24, and it is connected to a source of electrical power 108 through leads 102, 104. In a typical application, a plurality of the fastening mechanisms 10 are employed, as represented at 10(a), 10(b), and 10(c) of FIG. 4. As seen in FIG. 4, resistive elements 106(a), (b), and (c) are preferably connected in parallel and, through leads 110, 112, in series with power source 108 and normally open switch 114. As will be understood by those skilled in the art, the level of power required for a particular application is dependent upon the number of resistive elements employed, their respective resistances, and the response time required for the particular application. In the present embodiment, for example, resistive elements of about 15 to 20 ohms have been successfully employed.

In operation, when it is desired to actuate the fastening mechanism 10 to release the locking mechanism 28, normally open switch 114 (FIG. 4) is closed and an electrical current is conducted through leads 110, 102, 104, and 112 to the resistive elements 106(a), (b), and (c) to heat the resistive elements. Referring now to FIGS. 1a and 1b, the shape memory alloy element 24, is heated within a few seconds to a temperature above its transition temperature range, whereby it is transitioned to its austenitic state. The element 24 then "remembers" and returns to its original, elongated shape. The transition to the austenitic state occurs rather rapidly in a narrow temperature range. Heat produced by the electrical current passed through the resistive element is converted into mechanical energy, and substantial forces are exerted against the piston structure 54 for translating it upwardly within the chamber 16. As is known to those in the art, the transition temperature of such an element 24 is dependent upon the particular alloy employed and may be adjusted by varying the ratio of the alloyed materials, e.g., nickel and titanium. In a typical application using an element 24 of 50 percent nickel, having a length of approximately 15 centimeters and a stroke of approximately one centimeter, a transition temperature range of 75 degrees Centigrade is typical, and an application of three amperes of current to the respective heating elements 106 for about 35 seconds has been suitable for effecting the transition.

Upon being heated through its transition temperature range, the element 24 is translated to its austenitic state and expands longitudinally, translating the piston structure 54 toward the open end of the first housing portion 18 to its second, projected position shown in FIG. 1b. Translation of the piston structure 54 shears the shear pins 78(a), (b), and (c), and the internal lands 64, 66 of the piston structure 54 slide on their bearing surfaces 68, 70 within, and subsequently beyond, the land structures 74, 76 of the segmented locking structure 72 to the orientation seen in FIG. 1b, wherein the internal lands 64, 66 are disengaged from the external land structures 74, 76 of the segmented locking structure 72. Upon the piston structure 54 being thus translated to its second position, the segmented locking structure is no longer constrained against the connecting member shaft 30 by engagement of the external land structures 74 and 76 within the piston structure 15 internal lands 64 and 66. The locking structure segments 72(a), 72(b), and 72(c) are urged radially outwardly in reaction to compressive forces imparted when the connecting member 26 is initially threaded within the segmented locking structure 72, and the segments are thus displaced radially outwardly within the grooves defined between the internal lands 64, 66, as seen in FIG. 1b, thus disengaging and releasing the connecting member 26. As viewed in FIG. 1b, the connecting member 26 and second structure 36 are thus disconnected from the locking mechanism 28 and may be separated from the housing 12. It can thus be understood that the piston structure 54 constitutes a triggering member for releasing the locking mechanism upon being translated to its second position.

Thus, the fastening mechanism 10 is actuated to release the connecting member 26 and thereby permit separation of the first and second structures 34 and 36 by forces produced by the shape memory alloy element 24 as it is transitioned from its martensitic to its autensitic states. The release mechanism 10 is operable without the use of a pyrotechnic charge, as has been required in prior-art devices.

As may now be understood, the present invention is operable to provide releasable engagement between first and second structures without many of the disadvantages and limitations of prior connecting devices. For example, non-destructive testing of the release mechanism 10 prior to use may be accomplished conveniently by applying an electrical current to the resistive element 105 to translate the piston structure 54, and reassembly of the release mechanism subsequent to use is readily accomplished by transitioning the shape memory alloy element to its martensitic state, retracting the piston structure 54, and threading the connecting member within the segmented locking structure 72. Actuation of the release mechanism normally requires the application of an electrical current for several seconds, and the mechanism is thus not susceptible to inadvertent actuation by brief pulses or spikes of electrical current. Because it does not require the use of a pyrotechnic squib, the difficulties and expense entailed in safe storage and handling of such squibs are eliminated. Additionally, its operation does not transmit physical shock to the structure in which it is mounted.

While only one embodiment of the apparatus, together with modifications thereof, has been described in detail herein and shown in the accompanying drawing, it will be evident that various further modifications are possible in the arrangement and construction of its components without departing from the scope of the invention.

What is claimed is:

1. A releasable fastening apparatus, comprising:
   a housing;
   a connecting member;
   a locking mechanism supported by the housing and having a triggering member translatable within the housing between first and second positions, the locking mechanism comprising means for engaging the connecting member upon the triggering member being in its first position and for releasing the connecting member upon the triggering member being translated to its second position;
   a shape memory alloy actuator contained within the housing and capable of transitioning between a martensitic and an austenitic state, the shape memory alloy actuator comprising means for expanding longitudinally and translating the triggering member from its first to its second position upon being transitioned from its martensitic to its austenitic state; and
   means for transitioning the shape memory alloy actuator to its austenitic state for translating the triggering member to its second position.

2. The apparatus of claim 1, wherein the locking mechanism includes a gripping means for engaging the connecting member, the triggering member, in its first position, comprising means for constraining the gripping means in locked engagement with the connecting member and, upon being translated to its second position, comprising means for releasing the gripping means from engagement with the connecting member.

3. The apparatus of claim 1, wherein the gripping means comprises an elongated, annular structure having a plurality of radial segments having internal surfaces adapted to engage the connecting member and having at least two raised, external bearing surfaces, the triggering member comprising a piston structure having internal surfaces adapted to slidably engage the bearing surfaces upon the triggering member being in its first position and for disengaging the bearing surfaces upon the triggering member being in its second position.

4. The apparatus of claim 3, wherein the triggering member comprises a piston structure having an open end, the elongated annular structure extending within the piston structure through its open end.

5. A releasable fastening apparatus, comprising:
   a housing defining a piston chamber and an elongated chamber coaxially aligned with the piston chamber, the elongated chamber having a first end adjacent the piston chamber and a second end spaced from the piston chamber, the housing having an endwall adjacent the elongated chamber second end;
   a locking mechanism contained within the piston chamber, the locking mechanism including a piston structure, having an open end portion, slidably seated within the piston chamber and translatable between first and second positions, and a gripping mechanism extending coaxially within the open end of the piston structure;

a connecting member extending within the gripping mechanism, the piston structure comprising means for engaging the griping structure and constraining it in locked engagement with the connecting member when the piston structure is in its first position, and for releasing the griping structure from engagement with the connecting member when the piston structure is in its second position;

an elongated, shape memory alloy actuator seated within the elongated chamber and having a first end seated against the housing endwall and a second end seated against the piston structure, the shape memory alloy actuator comprising means for expanding longitudinally upon being heated above a transition temperature range to an austenitic state, for translating the piston structure to its second position, for releasing the connecting member.

6. The apparatus of claim 5, wherein the gripping member comprises an elongated, longitudinally segmented structure, the piston structure, in its first position, comprising means for constraining the segmented structure in locked engagement with the connecting member.

7. The apparatus of claim 6, wherein the gripping member includes a plurality of axially extending, radial segments.

8. The apparatus of claim 6, wherein the gripping member is internally threaded and wherein the connecting member includes external threads adapted to mate with the gripping member threads.

9. A method for connecting first and second structures, comprising the steps of:
providing a housing connectable to the first structure, a connecting member connectable to the second structure, and a locking mechanism supported by the housing for engaging the connecting member, the locking mechanism including a slidable triggering member for actuating the locking mechanism to release the connecting member;

providing an axially extending, shape memory alloy actuator capable of being transitioned between a martensitic, compressed state and an austenitic, elongated state, the shape memory alloy actuator being inserted within the housing adjacent and in axial alignment with the triggering member while in its martensitic state; and actuating the locking mechanism to release the connecting member by transitioning the shape memory alloy from its martensitic, compressed state to its austenitic, elongated state for translating the triggering member from its first to its second position.

10. The apparatus of claim 9, wherein the step of actuating the locking mechanism is accomplished by heating the shape memory alloy above its transition zone to cause transition of the shape memory alloy to its austenitic state.

* * * * *